United States Patent [19]

Boldish

[11] Patent Number: 4,635,681

[45] Date of Patent: Jan. 13, 1987

[54] ALTERING FLOW OF GASEOUS SUBSTANCES

[75] Inventor: Steven I. Boldish, Plano, Tex.

[73] Assignee: Ethyl Corporation, Richmond, Va.

[21] Appl. No.: 779,527

[22] Filed: Sep. 24, 1985

[51] Int. Cl.[4] .................. F16K 11/044; F16K 11/048; F16K 31/06

[52] U.S. Cl. ................................. 137/625.5; 251/65; 251/368

[58] Field of Search .......... 137/625.5, 625.66, 625.48; 251/65

[56] References Cited

U.S. PATENT DOCUMENTS

| | | | |
|---|---|---|---|
| 132,497 | 11/1872 | Spooner | 137/625.5 |
| 3,065,366 | 11/1962 | Speiser et al. | 310/15 |
| 3,134,395 | 5/1964 | Glasgow | 137/625.5 X |
| 3,202,170 | 8/1965 | Holbrook | 137/625.5 |
| 3,212,751 | 11/1965 | Hassa | 251/65 |

Primary Examiner—Martin P. Schwadron
Assistant Examiner—John S. Starsiak, Jr.

Attorney, Agent, or Firm—Donald L. Johnson; John F. Sieberth

[57] ABSTRACT

A system is described enabling the flow of gaseous substances to be altered or switched from one line to another as desired without need for lubricants or having parts in continuous frictional contact with each other. In essence, the system is composed of (a) a first chamber having a gas entry port, and a pair of gas exit ports; (b) a second chamber adapted to receive gas flowing through one of the exit ports, and additionally having a gas discharge port and a separate gas inlet port to receive another flow of gas; (c) a third chamber adapted to receive gas flowing through the other of the exit ports, and additionally having a gas discharge port and a separate gas inlet port to receive another flow of gas; and (d) an internal valve for alternatively sealing off one or the other of the gas exit ports. Preferably, the valve is magnetically actuated by means of a sub-system which is itself pneumatically actuated. The advantage of using the system in MOCVD are described.

14 Claims, 5 Drawing Figures

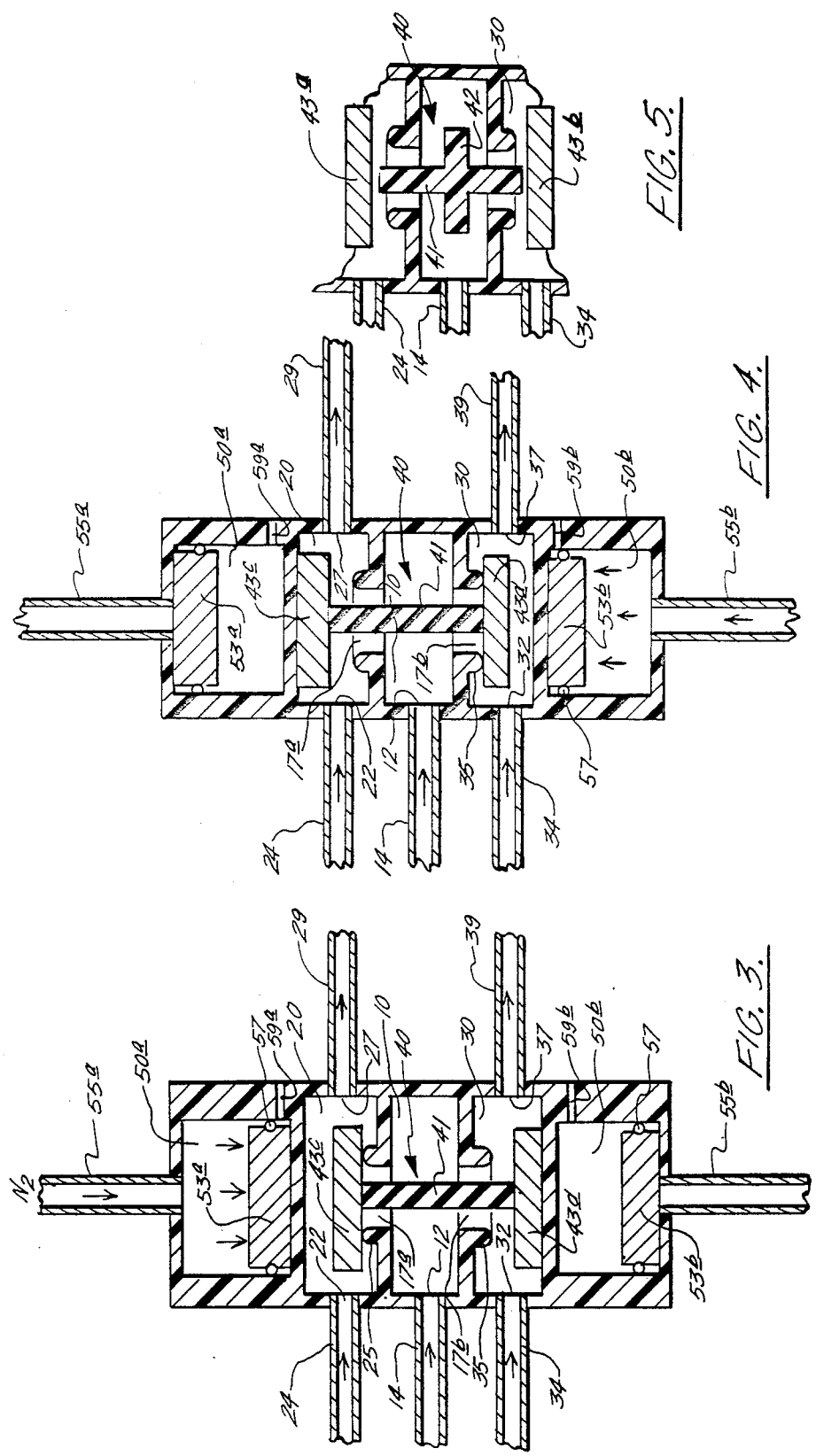

4,635,681

ALTERING FLOW OF GASEOUS SUBSTANCES

TECHNICAL FIELD

This invention relates to a system for altering the flow of gaseous substances and more particularly to a system for switching a flow of a gaseous substance from one line to another.

BACKGROUND

Many chemical operations involve transmission of gaseous substances to reaction vessels, such as autoclaves, pyrolysis chambers, combustion apparatus, and the like. In some operations of this type it is essential to provide continuous flow of gaseous substances of uniform composition at all times. One example is metal organic chemical vapor deposition (MOCVD) used in the manufacture of semiconductor materials wherein precisely controlled flows of uniform gaseous mixtures are essential. Many of the gaseous substances used in MOCVD are of extremely high purity and must be kept free of contamination. And in MOCVD operations there is a need in many cases to switch the flows of gaseous organometallic substances from one line to another. While stopcocks and other similar valving systems can be used, their operation depends upon frictional motion and sealing, and thus they require use of lubricants to prevent them from freezing up or coming loose during use. The lubricants are a source of impurities and thus are undesirable.

THE INVENTION

In accordance with this invention a system is provided which enables the flow of gaseous substances (often referred to hereinafter simply as "gas") to be altered or switched from one line to another as desired without need for lubricants or having parts in continuous frictional contact with each other.

In essence, the system of this invention is composed of (a) a first chamber having a gas entry port, and a pair of gas exit ports; (b) a second chamber adapted to receive gas flowing through one of said exit ports, and additionally having a gas discharge port and a separate gas inlet port to receive another flow of gas; (c) a third chamber adapted to receive gas flowing through the other of said exit ports, and additionally having a gas discharge port and a separate gas inlet port to receive another flow of gas; and (d) valve means for alternatively sealing off one or the other of said pair of gas exit ports.

In one of its preferred forms the system comprises:

(a) a first chamber having a gas entry port, and a pair of gas exit ports;
(b) a second chamber adapted to receive gas flowing through one of said exit ports, and additionally having a gas discharge port and a separate gas inlet port to receive another flow of gas;
(c) a third chamber adapted to receive gas flowing through the other of said exit ports, and additionally having a gas discharge port and a separate gas inlet port to receive another flow of gas;
(d) valve means disposed within said chambers and adapted to alternatively seal off one or the other of said pair of gas exit ports; and
(e) means for selectively actuating the valve means to cause it to seal off one or the other of said pair of gas exit ports.

Most preferably the means of (e) selectively actuate the valve member magnetically, although other arrangements are entirely suitable.

As will be apparent hereinafter, the system may be arranged either to alternatively seal off one or the other of the gas exit ports from inside of the first chamber or to alternatively seal off one of the gas exit ports from inside of the second chamber and the other of the gas exit ports from inside of the third chamber.

Pursuant to another preferred embodiment the system as above described further comprises means for selectively actuating the means of (e). As one way of accomplishing this, this invention provides as a particularly preferred embodiment pneumatically actuated means for selectively actuating the means of (e).

The above and other features and embodiments of this invention will become still further apparent from a consideration of the ensuing description, appended claims, and accompanying drawings in which:

FIG. 3 is a cross-sectional view of another preferred valving system of this invention illustrating the actuation and positioning of the valve member when it seals off one of the exit ports from inside the second chamber;

FIG. 4 is a cross-sectional view of the valving system of FIG. 3 illustrating the actuation and positioning of the valve member when it seals off the other of the exit ports from inside the third chamber; and FIG. 5 is a fragmented cross-sectional view of a variant of the system depicted in FIGS. 1 and 2.

It will be understood and appreciated that the Figures are illustrative and not in scale as the dimensions of the elements of the systems may be varied to suit the needs of the occasion.

Figure 2:
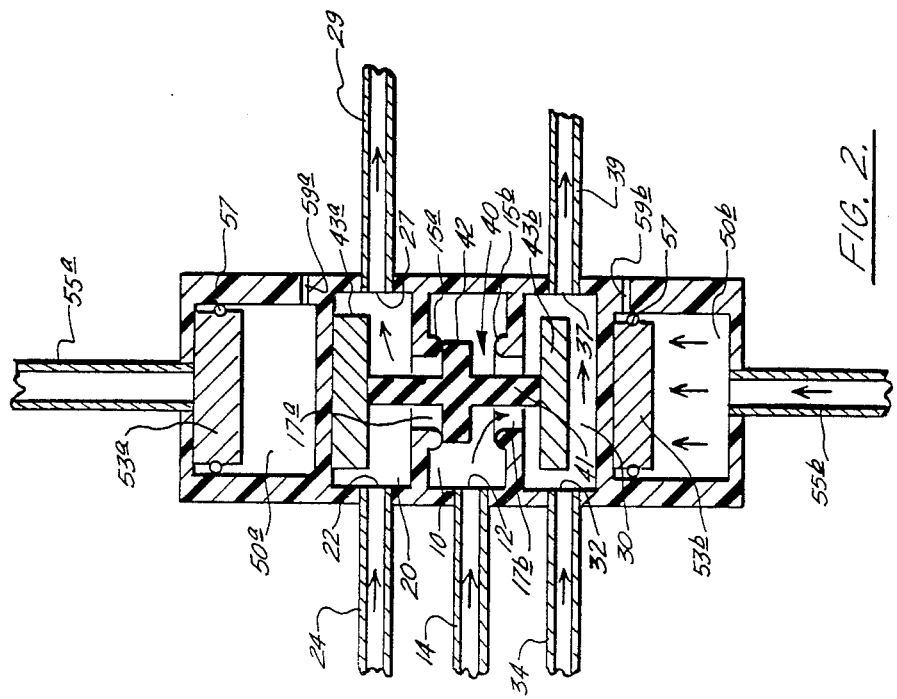
FIG. 2 is a cross-sectional view of the valving system of FIG. 1 illustrating the actuation and positioning of the valve member when it seals off the other of the exit ports from inside the first chamber.
Figure 1:
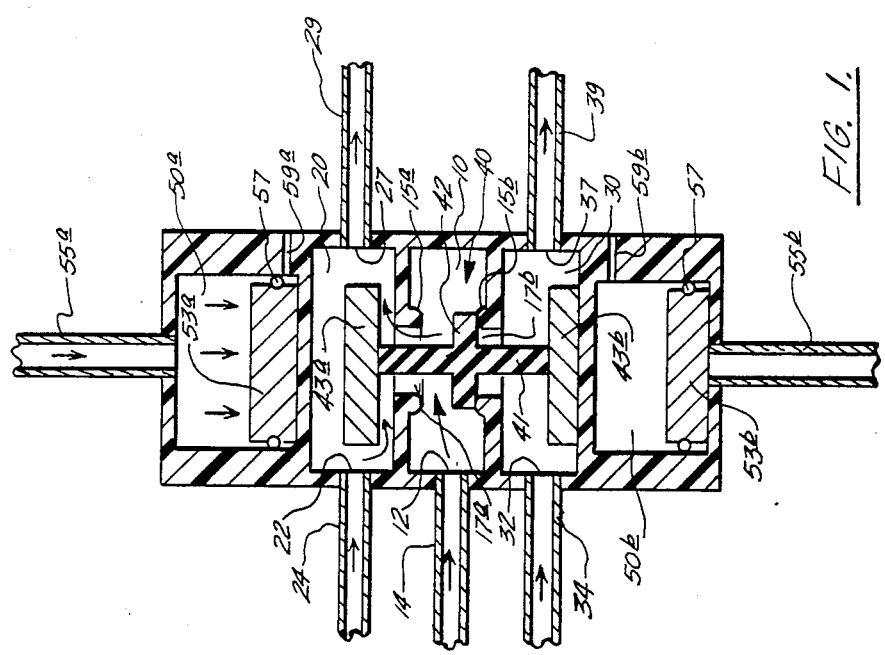
FIG. 1 is a cross-sectional view of a particularly preferred valving system of this invention illustrating the actuation and positioning of the valve member when it seals off one of the exit ports from inside the first chamber.

Referring now to the Drawings wherein like numerals are used to identify like parts, FIGS. 1 and 2 illustrate one valving system of this invention and FIGS. 3 and 4 illustrate a another valving system of this invention, both involving magnetic actuation of the valve member and pneumatic actuation of the means that actuate the valve member magnetically. Considering first the embodiment depicted in FIGS. 1 and 2, the system includes first chamber 10, second chamber 20, third chamber 30, valve member 40, and a pair of pneumatic chambers 50a, 50b. Chamber 10 is provided with three openings: inlet port 12 fed by line 14, and a pair of gas exit ports 17a, 17b disposed on opposite sides of the chamber. Chambers 20 and 30 also have three openings each, and in the form depicted are identical in size and shape, although they need not be. Thus chamber 20 is adapted to receive gas flowing therein through gas exit port 17a, and additionally has inlet port 22 fed by line 24, and outlet port 27 leading to line 29, whereas chamber 30 is adapted to receive gas flowing therein through gas exit port 17b, and additionally has inlet port 32 fed by line 34, and outlet port 37 leading to line 39.

In the embodiment depicted in FIGS. 1 and 2, valve member 40 is composed of stem 41, port closure or valve 42, and magnetic members or discs 43a and 43b. Stem 41 traverses chamber 10 and extends through (but does not block) gas exit ports 17a and 17b. Closure 42 is affixed to stem 41 and may be integral therewith if desired. Closure 42 is positioned within chamber 10 and is adapted to effect a gas tight seal against gas exit ports 17a and 17o. Thus closure 42 is composed of a suitable gas-impermeable material that is inert to the gaseous substances to which it is to be subjected, and which has the ability to form a gas tight seal when forced against the opening of the ports 17a and 17b. To this end it is desirable to employ a slightly deformable, tough, inert plastic or elastomeric material such as poly(tetrafluoroethylene), poly(perfluoroalkoxyphosphazene), a polyimide of the type produced from pyromellitic dianhydride and oxydianiline, an aromatic polyether ketone polymer, or the like for closure 42 and to provide a rim or other annular sealing surface 15a,15b against which closure 42 can be seated in forming a gas tight seal with gas exit ports 17a and 17b, respectively. Conversely, a rim or other annular sealing surface (not shown) may be provided on both sides of closure 42 near or adjacent its periphery to effect a gas tight seal against the wall around the perimeter of gas exit ports 17a and 17b. In the form depicted in FIGS. 1 and 2 discs 43a and 43b are attached to (and may be integral with) the respective end portions of stem 41, but they need not be (note FIG. 5). Member 43a is thus positioned within chamber 20, and member 43b within chamber 30. Preferably, members 43a and 43b are composed of or include a strongly magnetizable substance such as magnetized samarium-cobalt alloys, magnetized aluminum-nickel-cobalt alloys, or the like. If desired, members 43a and 43b may be coated by or embedded within any protective inert substance that does not materially impair the strength of the magnetic field emanating from members 43a and 43b. In one particularly preferred form, members 43a and 43b are composed of magnetized samarium-cobalt alloy encapsulated in stainless steel, which may be and preferably is electropolished.

Pneumatic chambers 50a and 50b are disposed adjacent chambers 20 and 30, respectively. In the form depicted chambers 50a and 50b serve as cylinders for magnetic pistons 53a,53b which in turn are alternately driven toward the proximate chamber 20 or 30 by application of pneumatic pressure (air, nitrogen, etc.) through line 55a or 55b respectively. Pistons 53a and 53b may be fitted within chambers 50a and 50b by means of a loose slip fit. Alternatively pistons 53a and 53b may be equipped with one or more O-rings 57 around their perimeters to facilitate sliding motion relative to the walls of chambers 50a and 50b. To facilitate the inward motion of pistons 53a and 53b, valves or vents 59a and 59b may be positioned at inward locations in the walls of pneumatic chambers 50a and 50b. To facilitate the outward motion of pistons 53a and 53b, a compression spring (not shown) may be positioned between piston 53a and the wall separating chamber 50a from chamber 20, and another compression spring (not shown) may be positioned between piston 53b and the wall separating chamber 50b from chamber 30. When no pneumatic pressure is being applied to line 55a, the spring in chamber 50a keeps piston 53a in an outer position such as shown in FIG. 2. However when pneumatic pressure is applied to line 55a, the pneumatic force overcomes the force exerted by the spring in chamber 50a and thus piston 53a is forced inwardly as indicated in FIG. 1. On release of the pressure the spring forces piston 53a back to its outer position. The same considerations of course apply to the functioning of the spring and the pneumatic pressure system of chamber 50b piston 53b being kept by the spring in chamber 50b in an outer position such as shown in FIG. 1 during the time no pneumatic pressure is being applied to line 55b, but being moved to an inner position such as in FIG. 2 when sufficient pressure is applied to line 55b to overcome the resistance offered by the spring in chamber 50b. Alternatively, valves 59a and 59b may be double acting valves, each adapted to either release or apply pneumatic pressure and positioned so that one such valve allows the air trapped in front of piston 53a or 53b (as the case may be) to escape from its pneumatic chamber while concurrently the other valve permits pressurized air to enter its pneumatic chamber behind the other of pistons 53a and 53b to force it from its inner position to its outer position.

Magnetic pistons 53a and 53b are preferably fabricated of the same type of stongly magnetized material as that discussed above in reference to members 43a and 43b, and are alternatively and alternately propelled inwardly and outwardly in chambers 50a and 50b to effect magnetic actuation or propulsion of valve member 40.

In order to achieve this magnetic actuation or propulsion, the magnetic poles of the proximate faces of member 43a and piston 53a are both the same (i.e., the magnetic fields emanating from these two members are positioned so as to repel each other) as are the magnetic poles of member 43b and piston 53b. Thus on applying pneumatic pressure against piston 53a as in FIG. 1, member 43a is forced away from piston 53a so that valve member 40 moves to the position shown in FIG. 1 whereby closure 42 is forced against and seals off gas exit port 17b. At the same time the movement of valve member 40 causes member 43b to approach piston 53b. Conversely, when the pneumatic pressure is applied against piston 53b as in FIG. 2, member 43b is forced away from approaching piston 53b by the mutual repulsive magnetic action between piston 53b and member 43b so that closure 42 is forced against and seals off gas exit port 17a, and member 43a is moved toward piston 53a.

As indicated in FIG. 5, members 43a and 43b need not be attached to stem 41. In other words, members 43a and 43b may be separate elements sized and positioned so that they do not block any of ports 22, 27, 32 and 37. To this end linear guide bars (not shown) may be coaxially disposed around the perimeters of members 43a and 43b to keep them axially aligned within their respective chambers and away from ports 22, 27, 32 and 37.

The system depicted in FIGS. 3 and 4 is the same in make-up and operation as that in FIGS. 1 and 2 with the exception that valve member 40 in the system of FIGS. 3 and 4 utilizes the interior portions of magnetic members 43c and 43d to effect the sealing of gas exit ports 17a and 17b, respectively. Thus as can be seen from FIGS. 3 and 4, port closure 42 has been eliminated from valve member 40 and, while not essential, it is preferable to provide a rim or other annular sealing surface 25 in chamber 20 around the perimeter of gas port 17a and a like rim or other annular sealing surface 35 in chamber 30 around the perimeter of gas port 17b. As an alternative, a rim or other annular sealing surface similar to rim 25 may be provided on the inward side of member 43c so as to create a gas tight seal around port 17a and a like rim or other annular sealing surface may be provided on the inward side of member 43d for effecting a gas tight seal around port 17b. In the embodiment of FIG. 3 and 4 magnetic members 43c and 43d may be composed entirely of a strongly magnetizable substance or they may be a composite of a strongly magnetized outer portion backed by a suitable inert, gas impermeable substance to effect the gas tight seal against gas port 17a or 17b, or sealing surface 25 or 35 (as the case may be). Here again use as the magnetic material of a magnetized samarium-cobalt alloy encapsulated in stainless steel is particularly preferred.

As indicated in FIG. 3, on application of pneumatic pressure against piston 53a, member 43c is forced away magnetically from piston 53a so that member 43c itself is forced against rim 25 and seals off gas exit port 17a. Conversely, when the pneumatic pressure is applied against piston 53b by means of line 55b as in FIG. 4, member 43d is forced (magnetically propelled) away from piston 53b so that member 43d is forced against and seals off gas exit port 17b.

The systems of this invention may be used in any operation in which it is desired to alter the flow path of one gas stream relative to two others and in so doing altering the concentration and/or the composition of one of the resulting streams For example when conducting MOCVD in the production of epitaxially coated semiconductor wafers a system such as depicted in FIGS. 1 and 2 or in FIGS. 3 and 4 may be used to considerable advantage by affixing, say, line 29 to the deposition chamber containing the wafers to be coated, and the other exit line, in this case line 39, to a waste gas burner or to a gas recycling system or to another deposition chamber system. A uniform constant flow of a desired carrier gas such as pure hydrogen is maintained in incoming lines 24 and 34, and with valve member 40 in the position shown in FIG. 2 (or FIG. 3 if using that system), a constant, uniform gaseous flow of, say pure hydrogen and a highly pure vaporized organometallic compound to be thermally decomposed in the deposition chamber is established and maintained in line 14. This flow thus passes from line 14 through inlet port 12 into chamber 10 from which it exits via open port 17b into chamber 30. In chamber 30 this flow is mixed with hydrogen coming into chamber 30 from inlet line 34 and the resultant mixture is transmitted via line 39 to the waste gas burner, or gas recycling system, or deposition chamber, or the like. When it is desired to switch the flow of organometallic compound to the deposition chamber fed by line 29 without need for making any adjustments in flow rates or the like, the pneumatic actuation of piston 53b (in FIG. 2) or piston 53a (in FIG. 3) is discontinued and the opposite piston (piston 53a in FIG. 2; piston 53b in FIG. 3) is actuated so that valve member 40 is switched to the position shown in FIG. 1 or FIG. 4. This causes the constant, uniform gaseous flow of pure hydrogen and the highly pure vaporized organometallic compound from line 14 to exit from chamber 10 via open port 17a into chamber 20. In chamber 20 this flow is mixed with hydrogen coming into chamber 20 from inlet line 24 and the resultant mixture is transmitted via line 29 to the deposition chamber to which it is connected. Since no lubricant is required in the system, a troublesome source of impurities is effectively eliminated. Since the motion of valve member 40 within the system does not involve continuous frictional interfacing of parts one against another, the possibility of seizure or loosening of moving parts is effectively eliminated. And since the entire valving system is enclosed and actuated magnetically, the possibility of air leakage into the system is virtually non-existant so long as the chamber walls are not broken and the incoming and outgoing lines are secure and leakproof.

It will now be apparent that many modifications may be made in the systems described above without departing from the true spirit and scope of this invention. To mention just one such modification for purposes of illustration, it can readily be appreciated that 53a and 53b need not be actuated pneumatically—they may for example be actuated hydraulically, mechanically, or manually. These and other suitable variants will probably occur to those skilled in the art from a consideration of this disclosure.

It is thought that the invention and many of its attendant advantages will be understood from the foregoing description and as noted, various changes may be made in the form, construction, and arrangement of the parts without departing from the spirit and scope of this invention, the forms hereinbefore described being merely preferred embodiments thereof. Thus it is not intended that this invention be limited by the description herein presented. Rather, what is intended to be covered is the subject matter set forth in the ensuing claims and the equivalents thereof available as a matter of law.

What is claimed is:

1. A system for selectively diverting and merging the continuous flow of one gaseous into the flow of one or the other of two other continuous gaseous steams which comprises:
   (a) a first chamber having a gas entry port, and a pair of gas exit ports;
   (b) a second chamber adapted to receive gas flowing through one of said exit ports, and additionally having a gas dischage port and a separate gas inlet port to receive another flow of gas;
   (c) a third chamber adapted to receive gas flowing through the other of said exit ports, and additionally having a gas discharge port and a separate gas inlet port to receive another flow of gas;
   (d) a pair of magnetic discs, one positioned within said second chamber and one positioned within said third chamber, said discs having interposed therebetween a stem traversing said first chamber and extending through, but not blocking, said pair of exit ports, said stem having intermediate its length a transverse port closure valve for sealing off one or the other of said pair of gas exit ports from the interior of said first chamber; and
   (e) means including a pair of magnets for alternatively magnetically repelling one or the other of said magnetic discs to cause the port closure valve to seal off from the interior of said first chamber the more remote of the gas exit ports.

2. Apparatus of claim 1 wherein said pair of magnets is an alternatively actuatable pair of pneumatically driven magnetic pistons each position within a pneumatic chamber, one pneumatic chamber being adjacent said second chamber and the other such pneumatic chamber being adjacent said third chamber.

3. Apparatus of claim 1 wherein sdid magnetic discs are connected to the opposite ends of said stem.

4. Apparatus of claim 1 wherein said magnetic discs are separate from but are adapted to abut the opposite ends of said stem.

5. Apparatus of claim 1 wherein said magnetic discs include a magnetized samarium-cobalt alloy.

6. Apparatus of claim 1 wherein said magnetic discs include a magnetized samarium-cobalt alloy encapsulated in stainless steel.

7. Apparatus of claim 1 wherein said magnetic discs are connected to the opposite ends of said stem and wherein said pair of magnets is an alternatively actuatable pair of pneumatically driven magnetic pistons each positioned within a pneumatic chamber, one pneumatic chamber being adjacent said second chamber and the other such pneumatic chamber being adjacent said third chamber.

8. Apparatus of claim 1 wherein said magnetic discs are connected to the opposite ends of said stem; wherein said magnetic discs include a magnetized samarium-cobalt alloy encapsulated in stainless steel; wherein said pair of magnets is an alternatively actuatable pair of pneumatically driven magnetic pistons each positioned within a pneumatic chamber, one pneumatic chamber being adjacent said second chamber and the other such pneumatic chamber being adjacent said third chamber; and wherein said magnetic pistons include a magnetized samarium-cobalt alloy.

9. Apparatus of claim 1 wherein said magnetic discs are separate from but are adapted to abut the opposite ends of said stem and wherein said pair is an alternatively actuatable pair of pneumatically driven magnetic pistons each positioned within a pneumatic chamber, one pneumatic chamber being adjacent said second chamber and the other such pneumatic chamber being adjacent said third chamber.

10. Apparatus of claim 1 wherein said magnetic discs are separate from but are adapted to abut the opposite ends of said stem; wherein said magnetic discs include a magnetized samarium-cobalt alloy encapsulated in stainless steel; wherein said pair of magnets is an alternatively actuatable pair of pneumatically driven magnetic pistons each positioned within a pneumatic chamber, one pneumatic chamber being adjacent said second chamber and the other such pneumatic chamber being adjacent said third chamber; and wherein said magnetic pistons include a magnetized samarium-cobalt alloy.

11. A system for selectively diverting and merging the continuous flow of one gaseous stream into the flow of one or the other of two other continuous gaseous streams which comprises:
(a) a first chamber having a gas entry port, and a pair of gas exit ports;
(b) a second chamber adapted to receive gas flowing through one of said exit ports, and additionally having a gas discharge port and a separate gas inlet port to receive another flow of gas;
(c) a third chamber adapted to receive gas flowing through the other of said exit ports, and additionally having a gas discharge port and a separate gas inlet port to receive another flow of gas;
(d) a pair of magnetic discs, one positioned within said second chamber for sealing off its proximate gas exit port from the interior of the second chamber, and the other of said discs positioned within said third chamber for sealing off its proximate gas exit port from the interior of the third chamber, said discs having interposed therebetween a stem traversing said first chamber and extending through, but not blocking, said pair of exit ports; and
(e) means including a pair of magnets for alternatively magnetically repelling one or the other of said magnetic discs so that the repelled magnetic disc and said stem cause the other magnetic disc to seal off its proximate gas exit port.

12. Apparatus of claim 11 wherein said magnetic discs include a magnetized samarium-cobalt alloy.

13. Apparatus of claim 11 wherein said magnets are a pair of magnetic pistons, one such piston being slidably disposed within a pneumatic chamber adjacent said second chamber and the other such piston being slidably disposed within a pneumatic chamber adjacent said third chamber, said magnetic pistons being adapted on application of pneumatic pressure to alternatively magnetically repel the proximate magnetic disc to cause the other of said magnetic discs to seal off its proximate gas exit port.

14. Apparatus of claim 11 wherein said magnetic discs include a magnetized samarium-cobalt alloy encapsulated in stainless steel and wherein said magnetic pistons include a magnetized samarium-cobalt alloy.

* * * * *

UNITED STATES PATENT AND TRADEMARK OFFICE
CERTIFICATE OF CORRECTION

PATENT NO. : 4,635,681
DATED : January 13, 1987
INVENTOR(S) : Steven I. Boldish

It is certified that error appears in the above-identified patent and that said Letters Patent is hereby corrected as shown below:

Column 1, line 46 reads "tne" and should read -- the --.

Column 3, line 5, reads "17o" and should read -- 17b --.

Column 6, line 29, reads "gaseous into" and should read -- gaseous stream into --.

Column 6, line 36, reads "dischage" and should read -- discharge --.

Column 6, line 62, reads "sdid" and should read -- said --.

Column 7, line 26, reads "pair is" and should read -- pair of magnets is --.

Signed and Sealed this

Thirty-first Day of March, 1987

Attest:

DONALD J. QUIGG

Attesting Officer     Commissioner of Patents and Trademarks